Feb. 9, 1971 U. CARPINO 3,562,648
MEASURING OF ELECTROMOTIVE FORCES
Filed Sept. 9, 1968 2 Sheets-Sheet 2

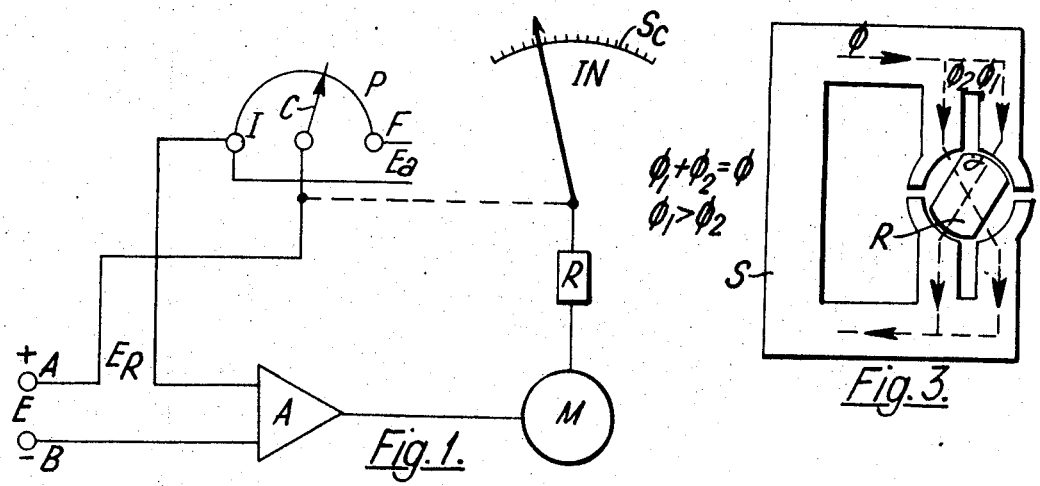
Fig. 1.
Fig. 3.
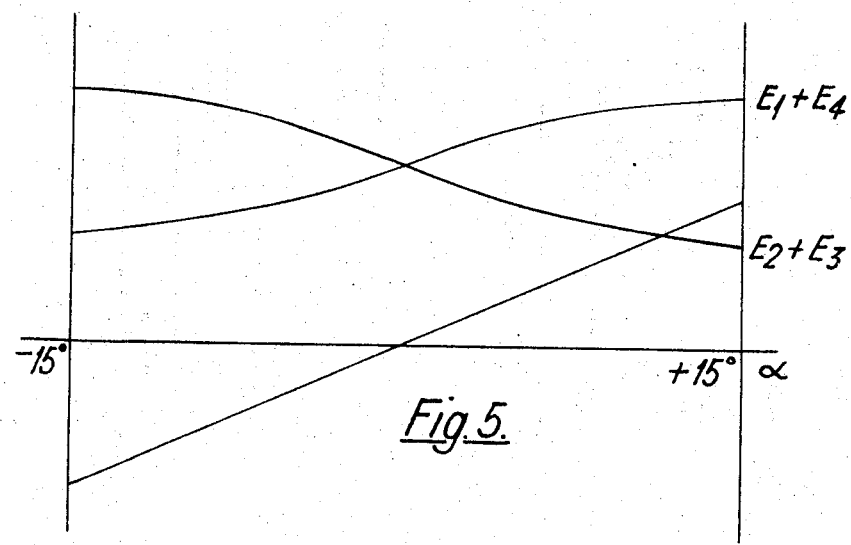
Fig. 5.
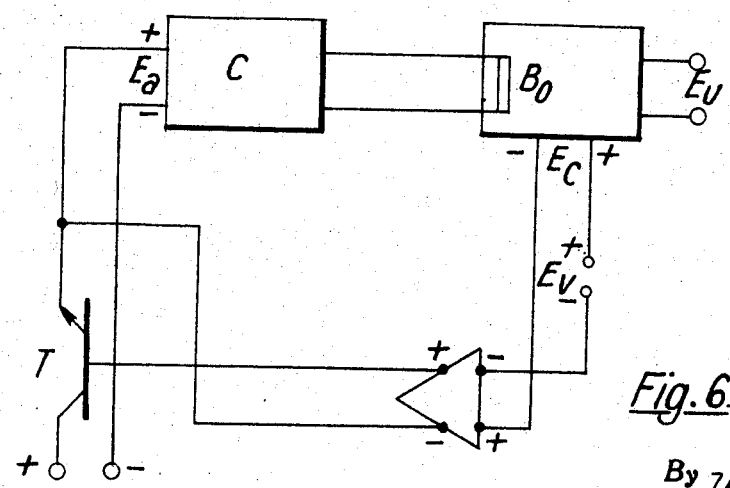
Fig. 6.

$\phi_1 + \phi_2 = \phi$
$\phi_1 = \phi_2$

Inventor
UGO CARPINO
By Young & Thompson
Attorneys

United States Patent Office 3,562,648
Patented Feb. 9, 1971

3,562,648
MEASURING OF ELECTROMOTIVE FORCES
Ugo Carpino, Milan, Italy, assignor to
Pio Guardigli, Trivulzio, Italy
Filed Sept. 9, 1968, Ser. No. 758,513
Claims priority, application Italy, Sept. 19, 1967,
20,637/67
Int. Cl. G01r *17/06;* G05f *7/00*
U.S. Cl. 324—99                                                       6 Claims

ABSTRACT OF THE DISCLOSURE

For measuring small direct-current electromotive forces a potentiometric instrument is used in which the direct-current voltage to be measured is compared with the direct-current output voltage of a magnetic balancing unit, said balancing unit being supplied in alternate-current and consisting of a four pole pieces stator with a primary input winding and four secondary output windings, one for each pole piece, and of a rotor, in which unit the output varies linearly with the angle of rotation of the rotor.

BACKGROUND OF THE INVENTION

Field of the invention

The present invention relates to the measuring of electromotive forces and, to this purpose, it concerns more particularly a magnetic balancing unit and a potentiometric instrument equipped therewith.

It is known that potentiometric instruments serve essentially to measure small direct-current electromotive forces with considerable precision. In the field of industrial measurements, the use of potentiometric instruments and automatic rebalancing is remarkably widespread today, especially for measuring temperature by means of thermocouples.

Description of the prior art

The instruments of this kind known at the present time are always equipped with a potentiometer, which represents the weak point of such instruments inasmuch as the sliding contact of the slider of the potentiometer itself is liable to become fouled owing to the effect of dust and to become oxidized by the effect of aggressive atmospheres. Consequently, the instrument needs frequent servicing. Moreover, in instruments exposed to continuous movement (for example multi-curve recorders), there is rapid wear of the winding of the potentiometer, with loss of linearity and, therefore, of precision of measurement.

The present invention purposes to eliminate these drawbacks by substituting for the potentiometer a unit capable of supplying a stable direct-current voltage proportional to the position of the measuring pointer, without using sliding contacts.

SUMMARY OF THE INVENTION

The present invention therefore relates to a magnetic balancing unit comprising a frame-like core interrupted and forked along one section thereof to form four pole pieces defining a cylindrical seat, a primary winding the ends of which constitute the input of the unit and which is wound on the core, four secondary windings wound one on each of said pole pieces and connected in series-opposition to supply the output of the unit, and a rotor mounted for rotation in said cylindrical seat, the proportioning of the various parts and in particular of the pole pieces being chosen in such manner that the output of the unit varies linearly with the angle of rotation of the rotor starting from the rest position thereof, for which the output is zero.

Such a unit may be used to construct an indicating or recording potentiometric instrument of improved type, which obviously comes within the scope of the present invention and in which the direct-current voltage to be measured is compared with the direct-current output voltage of a magnetic balancing unit of the kind hereinbefore described in order to balance the position of the pointer of the instrument by making use of the voltage difference and a servo motor, said position being linked to the angular position of the rotor of the magnetic balancing unit.

BRIEF DESCRIPTION OF THE DRAWINGS

The invention will now be described in greater detail with reference to the accompanying drawings, in which:

FIG. 1 shows the basic circuit diagram of a potentiometric instrument of known type;

FIG. 3 illustrates an operating condition of the unit of FIG. 2;

FIG. 5 is a qualitative diagram relating to the operation of the unit of FIG. 2; and FIG. 6 illustrates the application of the magnetic balancing unit forming an object of the invention in a potentiometric instrument also forming an object of the invention.

DESCRIPTION OF THE PREFERRED EMBODIMENTS

Referring first of all to FIG. 1, the operation of a conventional indicating instrument of potentiometric type will be briefly described. To an electromotive force E to be measured there is opposed a voltage drop $E_R$ existing between the end I and the slider C of the potentiometer P. The potentiometer P is fed by a source of electromotive force $Ea$ which is perfectly constant and of known value, so that $E_R$ is also known and depends solely on the position of the slider of the potentiometer P. The voltage difference between $E_R$ and E is amplified by means of the amplifier A and the amplified voltage obtained is used to control the reversible servo motor M. Through the medium of the reduction gear R, the servo motor M actuates the reading pointer $I_N$ of the instrument and the slider C of the potentiometer P. If the voltages $E_R$ and E are equal, the system is in balance and the position adopted by the pointer $I_N$ on the scale Sc supplies the measurement of the electromotive force E. If the voltage E varies, the reversible motor M rotates forward or backward according to whether E is greater than $E_R$ or E is smaller than $E_R$, until a new balance condition corresponding to the new value of E is found.

In recording instruments, instead of the motor M actuating a simple pointer, it actuates a pen or stamp writing system which records the measured value on a suitable graph sheet or chart which is movable as a function of time.

As has been said, in an instrument of this type, the use of a slider potentiometer P is a source of serious drawbacks which it is desired to eliminate.

Figure 2:
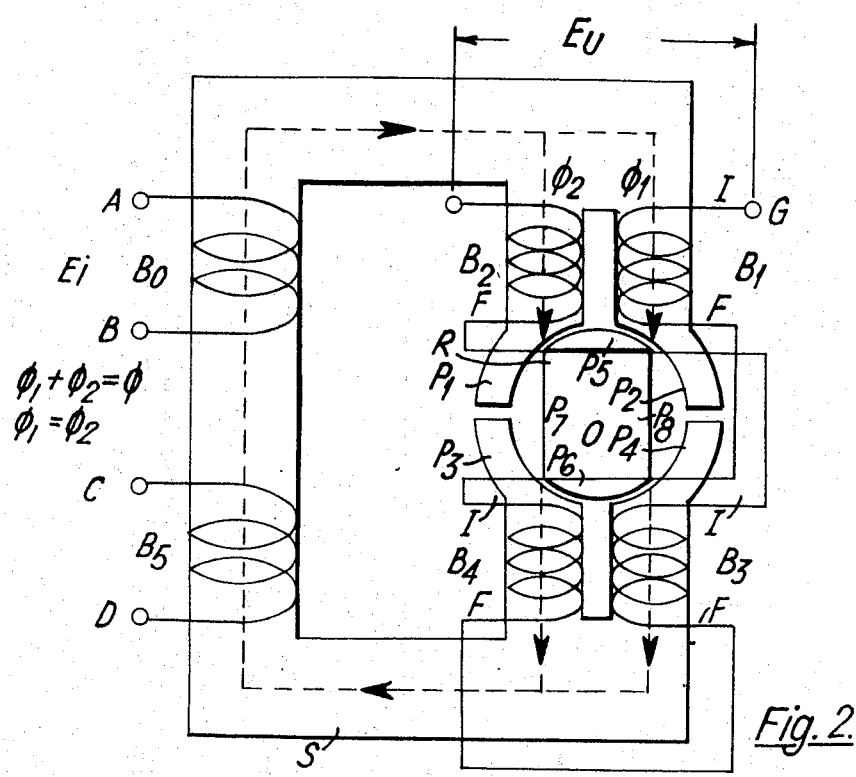
FIG. 2 shows a magnetic balancing unit according to the invention in a preferred constructional form thereof.

The magnetic unit illustrated diagrammatically in FIG. 2 has therefore been developed. This unit is constituted by a stator S and a rotor R both made of magnetic material, and six electrical windings $B_1$, $B_2$, $B_3$, $B_4$, $B_5$, $B_0$.

The stator S is formed as a rectangular frame interrupted on one long side to create four pole pieces $P_1$, $P_2$, $P_3$, $P_4$ having a cylindrical form and with their axis at right angles to the plane of the drawing and passing through O. The rotor R is pivoted on the axis O and is defined by two cylindrical surfaces $P_5$, $P_6$ with their axis at O and by two plane surfaces $P_7$, $P_8$ parallel to said axis O and to one another.

If the winding $B_0$ of this unit, which functions as a primary winding, is now supplied with an alternating-current voltage, an alternating flux $\phi$ is created in the stator S and is divided into two parts, $\phi 1$ and $\phi 2$, in correspondence with the pole pieces. If the rotor R is centred with respect to the pole pieces, $\phi 1$ will be equal to $\phi 2$. Under these conditions, the four windings $B_1$, $B_2$, $B_3$, $B_4$ will therefore be the seats of four induced electromotive forces of equal value.

With the connections shown in the drawing, a zero voltage will be obtained between the ends G and F of the windings $B_1$ and $B_2$. In fact:

$$E_1 + E_4 = E_2 + E_3$$

The position changes if the rotor R is rotated about its axis O: as the reluctance varies in non-uniform manner in the various branches of the magnetic circuit, the flux $\phi$ is distributed unequally. If, for example, the rotation of the rotor R is as shown in FIG. 3, $\phi_1 > \phi_2$ and also $\phi_4 > \phi_3$, for which reason, if we use $E_1$, $E_2$, $E_3$, $E_4$ to indicate the voltages induced in the windings $B_1$, $B_2$, $B_3$, $B_4$, respectively, we have:

$$E_1 + E_4 > E_2 + E_3$$

Between the points G and F (FIG. 2) of the unit there is then collected an output voltage $E_U$ having the same frequency and phase as the voltage $E_I$ supplying the primary $B_O$ and the amplitude of which is a function of the angle of rotation $\alpha$ of the rotor with respect to the central position of equilibrium.

With suitable dimensioning of the pole pieces, the air gap and the rotor, it is possible to make the output voltage $E_U$ a linear function of $\alpha$ for values ranging between $\pm 10° \div 15°$, in a similar manner to what occurs in a potentiometer. The unit constructed in this way and described is, however, not yet suitable to be substituted for a potentiometer in an instrument of the potentiometric type. In fact, it is necessary for the unit to supply a direct-current output voltage and not an alternating-current output voltage. Moreover, it is necessary to make sure that the flux $\phi$ is kept constant, this being an essential condition to enable linearity of the relation between the voltage $E_U$ and the angle $\alpha$ to be achieved.

Figure 4:
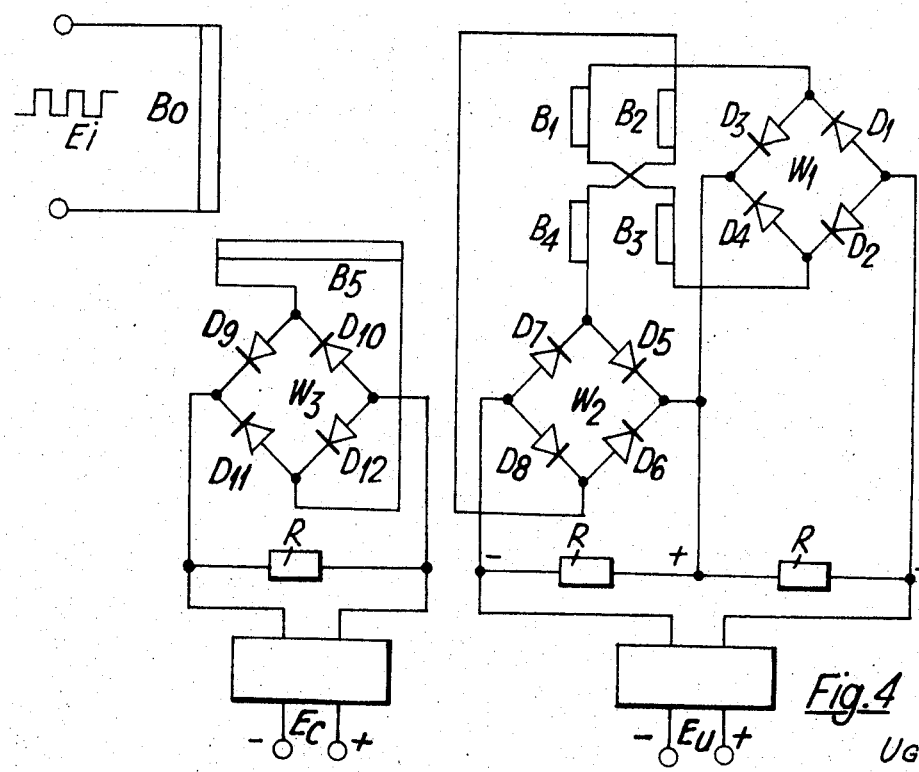
FIG. 4 is a diagram of circuits adapted to permit the use of the magnetic unit according to the invention in direct current instruments.

In order to be able to obtain from the unit of FIG. 2 a direct-current voltage proportional to the angle $\alpha$ by which the rotor R is rotated, it is possible to use a connection of the type of that shown in FIG. 4: that is, the voltages $E_1$ and $E_4$ supplied by the windings $B_1$ and $B_4$ are added together and rectified by means of a Graetz bridge diode rectifier W1 loaded by a resistor R. The same is done at W2 in the case of the voltages $E_2$ and $E_3$ delivered by the windings $B_2$ and $B_3$. The rectified output voltages supplied by the two bridges W1 and W2 are connected in opposite and thereafter filtered by means of a low-pass filter. In this way there is obtained a direct-current output voltage $E_U$ the value of which is a linear function of the angle $\alpha$ adopted by the rotor.

The diagram of FIG. 5 shows in qualitative fashion the course of the voltages $E_1$, $E_2$, $E_3$, $E_4$, and $E_U$ as a function of $\alpha$.

As can be seen, in the range of $\alpha$ considered, the amplitude of the voltages $E_1$, $E_2$, $E_3$, $E_4$ varies to a limited extent, so that possible errors of linearity which are due to the initial portion of the conduction characteristic of the diodes making up the bridges W1 and W2 are avoided.

Furthermore, in order to ensure that the flux $\phi$ is kept constant, the coil $B_5$ wound on the stator S in a position remote from its pole pieces is employed. The whole flux $\phi$ obviously passes through this coil or winding $B_5$ and it therefore delivers a voltage proportional to $\phi$ whatever the position of the rotor R. The output voltage of $B_5$ is consequently rectified by means of a diode bridge W3 fully identical to the bridges W1 and W2 and is thereafter filtered (FIG. 4).

As the voltage $E_C$ which is obtained is proportional to the flux $\phi$, it can be used to keep the flux $\phi$ itself at a constant value. This is achieved, for example, by employing a circuit of the type shown in FIG. 6. The winding $B_O$ is supplied by means of a transistorised static converter CT of the saturatable transformer type. A converter of this type supplies at its output an alternating-current voltage the amplitude and frequency of which are functions of the direct-current supply voltage $E_A$. The voltage $E_A$ is regulated by means of the transistor T driven by the amplifier A, which in turn received a signal equal to the difference between the voltage $E_C$ supplied by the winding $B_5$ of the magnetic unit and a constant reference voltage $E_r$. In this way there is formed a closed circuit which tends to keep the flux $\phi$ in the magnetic balancing unit constant, exactly as desired.

In fact, if, for any reason whatsoever, the flux $\phi$ increases, the voltage $E_C$ increases, while the voltage $E_r$ remains constant. The amplifier A is connected in such manner that under these conditions its output voltage decreases. The voltage $E_A$ thereby decreases and, consequently, the flux $\phi$ tends to return to its original value. The precision of the system, that is the constancy of the flux $\phi$, is all the higher the higher the gain of the amplifier A. In theory, for $A = \infty$, the flux $\phi$ remains absolutely constant. In practice, it is very easy to obtain a precision of the flux of the order of units per thousand.

There is therefore available a direct-current voltage $E_u$ the value of which is unfailingly dependent solely on the angle $\alpha$ of the rotor R of the unit according to the invention, which can be substituted with advantage for the potentiometer P of FIG. 1 in any indicating or recording instrument of the type shown in said FIG. 1 with an electrical connection substantially equal to that used for the potentiometer P and by mechanically linking the pointer $I_N$ of the instrument and the rotor R of the unit on rotation.

It is understood that the embodiments of the unit described may be different without thereby departing from the scope of the invention. It is also understood that variations and modifications may be made within the same limits in the unit which has been described.

I claim:

1. A magnetic balancing unit having an A.C. voltage input comprising a frame-like core of magnetic material interrupted along one section thereof to provide two spaced, opposed end sections, each said end section being forked to define two pole pieces, the pole pieces of each end section being formed to cooperate with the pole pieces of the opposed end section to define a cylindrical opening between said end sections substantially enclosed by said pole pieces, a primary winding wound on said core to provide the A.C. input for said balancing unit, four secondary windings wound one on each of said poles pieces and connected in series opposition to provide the electrical output for said balancing unit, a rotor of magnetic material mounted for rotation in said cylindrical opening, said rotor, core and pole pieces being proportioned in such a manner that the electrical output of said balancing unit varies linearly with the angle of rotation of the rotor starting from a rest position thereof in which said rotor is aligned with said opposed end sections and for which the output is zero, and compensating means including a compensating winding wound on said core to provide an output indicative of the flux passing through said core, said compensating means operating to provide a closed loop regulating circuit to correct the A.C. input to said primary winding to compensate for flux changes in said core and maintain a constant flux.

2. The magnetic balancing unit of claim 1 wherein said core is substantially rectangular in configuration, said spaced opposed end sections being formed in a first leg of said core and said primary and compensating windings being wound upon a second leg of said core, said second leg being spaced from said first leg and forming an opposed side of said core.

3. The magnetic balancing unit of claim 1 which includes first diode means for rectifying the output from said secondary windings and second diode means for rectifying the output from said compensating winding, said first and second diode means including circuits having substantially equal electrical characteristics.

4. The magnetic balancing unit of claim 3 wherein said first diode means includes a first bridge diode rectifier connected to rectify the sum of the voltages from two of said secondary windings and a second bridge diode rectifier connected to rectify the sum of the voltages from the remaining two of said secondary windings, the rectified outputs from said first and second bridge diode rectifiers being connected in opposition.

5. The magnetic balancing unit of claim 2 wherein said compensating means includes converter means connected to provide an A.C. signal to said primary winding, said converter means operating to provide an A.C. signal having an amplitude and frequency which are functions of a D.C. input signal to said converter means, rectifier means for rectifying the output from said compensating winding to provide a D.C. compensating signal, D.C. input means for providing a constant voltage D.C. reference signal, difference means to receive said D.C. compensating signal and said constant voltage D.C. reference signal and to provide a D.C. difference signal indicative of the difference between said reference and compensating signals to the input of said converter means.

6. The magnetic balancing unit of claim 1 which includes rectifying means to rectify the output from said secondary windings, comparison means to compare the rectified output from said secondary windings with a direct current voltage to be measured to obtain a difference voltage, servo motor means connected to be controlled by said difference voltage, said servo motor means operating to rotate said rotor, and an indicating pointer connected to rotate with said rotor.

References Cited
UNITED STATES PATENTS

| | | | |
|---|---|---|---|
| 2,455,672 | 12/1948 | Greenough | 323—52X |
| 2,516,092 | 7/1950 | Roessler, Jr. | 324—99 |
| 3,005,969 | 10/1961 | Wysocki | 336—135X |
| 3,461,376 | 8/1969 | Wanlass | 321—18X |

FOREIGN PATENTS

| | | | |
|---|---|---|---|
| 555,042 | 7/1932 | Germany | 336—135 |

RUDOLPH V. ROLINEC, Primary Examiner

E. F. KARLSEN, Assistant Examiner

U.S. Cl. X.R.

323—51; 336—135